(12) United States Patent
Baumard

(10) Patent No.: US 7,251,640 B2
(45) Date of Patent: Jul. 31, 2007

(54) METHOD AND SYSTEM FOR MEASURING INTEREST LEVELS OF DIGITAL MESSAGES

(76) Inventor: Philippe Baumard, 862 C de Haro, San Francisco, CA (US) 94107

( * ) Notice: Subject to any disclaimer, the term of this patent is extended or adjusted under 35 U.S.C. 154(b) by 0 days.

(21) Appl. No.: 10/940,463

(22) Filed: Sep. 14, 2004

(65) Prior Publication Data

US 2005/0058261 A1  Mar. 17, 2005

(30) Foreign Application Priority Data

Sep. 15, 2003  (EP)  ................................. 03292274

(51) Int. Cl.
*G06F 17/00* (2006.01)
(52) U.S. Cl. ........................... 706/45; 706/13; 706/16; 706/17; 706/21
(58) Field of Classification Search .................. 706/45
See application file for complete search history.

(56) References Cited

U.S. PATENT DOCUMENTS

| | | | |
|---|---|---|---|
| 5,704,017 A * | 12/1997 | Heckerman et al. | 706/12 |
| 5,864,848 A * | 1/1999 | Horvitz et al. | 707/6 |
| 5,999,932 A | 12/1999 | Paul | |
| 6,023,700 A | 2/2000 | Owens et al. | |
| 6,161,130 A * | 12/2000 | Horvitz et al. | 709/206 |
| 6,400,810 B1 | 6/2002 | Skladman et al. | |
| 6,421,709 B1 | 7/2002 | McCormick et al. | |
| 6,438,215 B1 | 8/2002 | Skladman et al. | |
| 6,480,832 B2 * | 11/2002 | Nakisa | 706/13 |
| 6,505,167 B1 * | 1/2003 | Horvitz et al. | 705/9 |
| 6,553,358 B1 * | 4/2003 | Horvitz | 706/45 |
| 2002/0116463 A1 | 8/2002 | Hart | |

(Continued)

FOREIGN PATENT DOCUMENTS

DE  101 14 649  3/2001

(Continued)

OTHER PUBLICATIONS

David Heckerman, A Tutorial on Learning With Bayesian Netwroks, Microsoft Research Advanced Technology Division, MSR-TR-95-06, p. 39-40.*

(Continued)

*Primary Examiner*—Fan Tsang
*Assistant Examiner*—Hemant Patel
(74) *Attorney, Agent, or Firm*—Trop, Pruner & Hu, P.C.

(57) ABSTRACT

In an electronic communication system, relevance levels of an incoming or outgoing message for presenting it to an interlocutor is measured without having to actually interact with the interlocutor, by a method comprising the steps of extracting from the message, a flow of digital signals pertaining to transmission/reception context features, to content of the message and/or to other interlocutors with the interlocutor; weighting probabilistically the digital signals by means of indicators of relative and interrelated frequencies of occurrences of the same digital signals extracted from previous messages; from the results of the above steps, auto-generating a Bayesian network that allows the interlocutor to obtain a probabilistic prediction on the attractiveness of sent/received signals or messages, or find most probably interested interlocutors for a given information or message, each node of the Bayesian network being associated with a signal.

20 Claims, 3 Drawing Sheets

U.S. PATENT DOCUMENTS

| | | | |
|---|---|---|---|
| 2002/0147988 | A1 | 10/2002 | Nakano |
| 2002/0159575 | A1 | 10/2002 | Skladman et al. |
| 2003/0012348 | A1 | 1/2003 | Skladman et al. |
| 2003/0046421 | A1* | 3/2003 | Horvitz et al. ............... 709/238 |
| 2003/0050981 | A1 | 3/2003 | Banerjee et al. |
| 2003/0050988 | A1 | 3/2003 | Kucherawy |
| 2005/0084082 | A1* | 4/2005 | Horvitz et al. ......... 379/114.06 |

FOREIGN PATENT DOCUMENTS

| | | |
|---|---|---|
| FR | 2 830 642 | 10/2001 |
| GB | 2 366 164 | 2/2002 |
| WO | WO 01/97089 | 6/2001 |

OTHER PUBLICATIONS

Vaughan-Nichols, "Saving Private E-Mail," XP-002273601, IEEE Spectr. (USA), IEEE Spectrum, vol. 40, No. 8, pp. 40-44 (Aug. 2003).

Graham, "A Plan for Spam," XP-002273602, Internet, pp. 1-8 (Aug. 2002).

Friedman et al., "Bayesian Network Classifiers," Kluwer Academic Publishers, Boston, pp. 1-36 (1997).

Friedman et al., "Bayesian Network Classification with Continuous Attributes: Getting the Best of Both Discretization and Parametric Fitting," pp. 1-36 (1996).

Guo, "A Bayesian Approach for Automatic Algorithm Selection," Dept. of Computing and Information Sciences, Kansas State University, Manhattan, KS, USA, pp. 1-5.

Jameson et al., "Making Systems Sensitive to the User's Time and Working Memory Constraints," Dept. of Computer Science, University of Saarbrücken, Germany, pp. 1-8.

Guo, "A Bayesian Approach for Automatic Algorithm Selection," Dept. of Computing and Information Sciences, Kansas State University, Manhattan, KS, USA, pp. 1-5, (Sep. 2003).

Jameson et al., "Making Systems Sensitive to the User's Time and Working Memory Constraints," Dept. of Computer Science, University of Saarbrücken, Germany, pp. 1-8, (1999).

* cited by examiner

METHOD AND SYSTEM FOR MEASURING INTEREST LEVELS OF DIGITAL MESSAGES

BACKGROUND OF THE INVENTION

The present invention relates generally to electronic communication between individuals or interlocutors, through the automated support of machines and, more particularly, to a method and system that facilitate use of existing equipments for communication between interlocutors.

The constant purpose of technology is to progress for reducing of the burden imposed by the real world on the life of human beings. Modern equipments of communication like telephones, mobile phones or computer with the Internet, offers many easy ways of communication. The other side of the coin is the overabundance of messages easy transmitted and not always good targeted. This possible overabundance of messages, sometimes undesired, can generate new burdens for which solutions were already searched in background art.

DE 10114649 discloses a method allowing to set a filter in a messages database to let incoming messages be disabled or transmitted to a mobile or conventional telephone in function of their source. The human being still has the burden of determining undesired sources and to manually set the filter. The method requires initially comparing incoming subscriber directory numbers.

US2003/0050988 discloses e-mail system providing filtering methodology on a per-domain basis. Known interfaces like Sendmail Mail Filter API allowing third party software to validate and modify messages as they pass through the mail transport system, predetermined rules are applied on incoming messages for permitting or not a connection. The problem is that rules based on, for example a great number of messages from the domain are not necessary relevant about the interest of one or many messages in the flow for the receiver.

US2003/0012348 discloses a method and system for filter based message processing in a unified messaging system. A Unified message server centralises messages from different sources. The Unified message server can compute not only text but also voice with a voice recognition system. The user can request that messages from a particular source or regarding a specific subject are discarded, rather than stored for later retrieval. The user still has the burden to built the profile, the static form of which at a given time, not necessary being adapted to an incoming message of a non foreseen kind.

US2003/005081 discloses a method, apparatus, and program to forward and verify multiple digital signatures in electronic mail. If a message has a portion with no corresponding digital signature or if one or more of the digital signatures is not trusted, the user may handle the message accordingly or a mail server may discard it. Such systems only work in a context of specific kind of messages and not for any kind of message.

U.S. Pat. No. 6,023,700 discloses an electronic mail distribution system for integrated electronic communication. Options are used to define a set of rules to be applied to inbound and outbound messages so that messages are sent and received in accordance with the preferences of the senders and receivers. The predefined rules of the set of rules, are not adapted to situation which is not foreseen and doesn't necessarily reflect a potential interest of the interlocutor for a message of exception.

US2002/0159575 discloses a method and system for filtering notification of e-mail messages. The system includes a user interface that permits subscribers to populate filter lists with e-mail message attributes. A notification system selectively notifies therewith subscribers of incoming e-mail messages based on the contents of the contents of their respective filter lists. The problem is that a potential interlocutor who could be interested by a message, would be not notified when not subscribing before. Similar system and method is disclosed in U.S. Pat. No. 6,400,810.

US2002/0147988 discloses a method and apparatus for notifying users of filtered e-mail using a set top box. A user specifies filtering criteria which then detects the arrival of an e-mail fulfilling the specified criteria, and notifies the user accordingly. The user has no knowledge of a potential interesting message outside of the filtering criteria previously specified.

U.S. Pat. No. 5,999,932 discloses a system and method for filtering unsolicited electronic mail messages using data matching and heuristic processing. At least one heuristic process is provided to determine whether the electronic mail message may be of interest to the user. An heuristic is based on a set of rules activated when data of the header don't specifically match with an associated predetermined field. An activated rule searches for example in the field "FROM" if the domain of the source instead of the source itself is assured to be junk-free. To be junk-free doesn't necessarily means that the message is of potential interest for the receiver. It is still boring to specify a great number of rules which by nature, will be not appropriate for any unforeseen case.

GB 2366164 discloses servers having filter data stored therein for selecting messages to be forwarded to user stations in dependence on filter criteria specified by the users. Hereto, the burden of the user remains, induced by a priori specification of the criteria which, even in great number, could always be incomplete, simply because the user may have some difficulties to forecast the interest of the content of a message without having read it before.

WO 01/97089 discloses a secure forwarding system. After processing in a filter layer, a received message from a sender and further retrieving recipient delivery preferences, the received message is forwarded or not to the intended recipient. The system needs to provide a filter unit in the filter layer for supporting a particular messaging format. Because it needs to know the intended recipient to retrieve recipient delivery preferences, the system will not transit a message to a non intended recipient who could have interest in the message.

U.S. Pat. No. 6,438,215 discloses a method and system for filter based message processing in a unified messaging system. A mechanism enable a user to filter certain message tributes such as the identification of the sender, recipient or the subject header or the message type. The content of the message per se cannot constitute an attribute because it cannot be predicted as a whole by nature when containing information.

US2002/0116463 synthesises well the general orientation of the state of the art, that is to filter unwanted messages. Application of rules is based upon the preponderance of predetermined words within an e-mail message. The problem is that a message with predetermined words can be interesting for the recipient. Some content of an identified suspect message is transmitted to the recipient who has to decide if the message is really unwanted. New words may be added to the base to complete the predetermination of the rules. The user is still called on services of filtering process, inducing a burden for him. A message without predetermined words will not be filtered, even when not necessarily unwanted, the message is without interest for the recipient.

U.S. Pat. No. 6,421,709 discloses e-mail filters and method thereof. It is necessary to let a user compile or be provided with character strings which a user would not wish to receive, for a first filter. It is further necessary to let a user compile or be prided with character strings which a user would wish to receive, for a second filter. The user has to review results of rejection. The user may wish less contribution to the process.

The state of the art provides not a full satisfaction for solving a known technical problem in the domain of machine-to-machine, machine-to-human, and/or interpersonal communication. In communication between individuals through electronic media, it is impossible for individuals to really determine their interest in an incoming message before they have got knowledge or read this message. Likewise, it is impossible for an individual to know if a stimulus, a signal or a message is interesting for another individual before this message, signal or stimulus is acknowledged, acquired or read by the receiver.

This problem implies that individuals, machines or organizations may receive signals, stimuli or messages they are not interested in. Inversely, individuals, machines or organizations may send stimuli, signals or messages that are not interesting for their receivers.

Another known problem in the technical domain of communication is the impossibility for an individual or a group of individuals (e.g. an organization) to know in advance if they would have a propensity or a will to communicate with another individual. This known problem is known as the learning curve of communication. In order to know if another individual would be interesting to interact with, a person has to experience and actually communicate with this other person. This problem in interpersonal communications increases the risk of unwanted interactions, and diminishes the propensity to communicate to unknown individuals.

The invention supplies to individuals the probability level of their own interest in an incoming signal, stimulus or message, before they get actual knowledge of its contents. It also supplies to individuals the names of potential receivers for a stimulus, message, text or content that they possess and are willing to share, without knowing who, in the population of people they interact with, will be interested in them.

Another problem, which is critical to the industry, is that individuals may have to process a lot of stimuli in order to build their own knowledge of the interest they have in potential interlocutors and/or signals, stimuli or messages. This problem creates information overload and bottlenecks at the individual and organizational level. People spend a lot of time building their appreciation of the interest of interaction of other individuals. They also spend a lot of time searching for people who have stimuli, signals, information or messages that could be interesting for them. The experience of individuals in this matter is built ex-post, that is to say that this learning is postdictive (learnt after having had the experience of the interaction). On the contrary, if it were possible, individuals would greatly benefit from a predictive learning of the propensity of their interlocutors to communicate with them.

Likewise, when individuals possess or generate information or messages, so to express or share their knowledge, they have to rely on their learning curve, tacit knowledge, experience or intuition to determine who might be interested in their production, or the message, stimulus, signal, content they possess. The likeliness of this information or knowledge not being of great interest for the chosen interlocutors is not null. Consequently, knowledge is not transmitted to the adequate people in organizations, and may never reach them. There might be individuals who are interested in this stimulus, message, chunk of knowledge, but who are unknown to the sender or creator of this knowledge.

To date, the problem for the industry is that a machine cannot generate this predictive knowledge of the mutual or asymmetric propensity to communicate between individuals automatically. The industry is forced to ask individuals to discriminate manually the people or the messages that are not welcome. Likewise, the problem to date for the industry is that a machine cannot generate the names of the potential receivers who might be ingested in a message or chunk of knowledge as well.

Existing technical solutions and answers to this problem require a human intervention, either from the interlocutor (here after, the "communicator") or by the organization managing the communication system (hereafter, the "operator"). Previous technical solutions to this problem were therefore based on the following technical processes and characteristics where the communicator was asked to define manually, by checking a list, or by integrating the data by himself in a man-machine interface, the list of words, chunks of text, or list of persons he or she did not want to interact with. This technology is known as filtering. The problem is however persistent because people who can be unwanted can still send a very interesting message and vice-versa, people who are welcome to communicate may sometimes send very unwanted or uninteresting message. Hence, filtering technologies that require the brutal discrimination of senders or text are not to date optimal solutions.

Other patented processes proposed to generate a set of rules, based on the analysis of the behavior of the communicator. These previous technical solutions such as the one disclosed in FR 2830642, were mostly based on the order of reading emails, interpreted as a hierarchical prioritization by the communicator. Previous technical solutions also automatically record and observe how people were opening, closing, displacing, destroying, the speed of reading their incoming messages, and were generating rules about the behavior of the communicator. Previous technical solutions are relying on "pre-defined" actions and explicit communication models that were under surveillance as to generate rules concerning the behavior of the communicator. The types of action (speed of reaction, length of feedback, speed of destruction of incoming unwanted messages, etc.) are used in previous technical solutions to learn what interlocutors or content the communicator was more likely to discriminate. However, previous technical solutions are not capable to exhaustively and simultaneously address the combination of content, context and individuals. Also, previous technical solutions are relying on pre-conceived assumptions on the communication between individuals. For example, previous technical solutions could declare that an interlocutor was not welcome because his or her messages were read very quickly and displaced or destroyed very soon after they were received. Yet, studies have shown that individuals in the working place who receive romantic messages from their love partners tend to destroy them very quickly for the protection of their privacy. Previous technological solutions based on rules generation would have declared these incoming messages and senders are very unwanted.

Other previous technical solutions are based on "collaborative filtering". People preferences for a content are recorded when they consult a content or receive/emit a message. Correlations are built between people and content, and a feedback can be given to any individual under the form: "people who have chosen this content also appreciated these other contents". Collaborative filtering can be applied to contents, objects or individuals. Technical solutions that try to match people according to their interest are also using collaborative filtering technologies. Collaborative filtering cannot however, take a chunk of knowledge, information or a stimulus, and find the one person who is the most probably interest in reading this message, and does not solve the above technical problem of the industry.

An object of the invention is to solve the general problem of matching individuals and contents, under the form of any stimulus that can be transformed in a digital or electronic form.

Another object of the invention is to support and accompany interpersonal communications the domain of life support systems.

A more precise object of the invention is to provide individuals with technical means allowing them to predict their interest and/or propensity to reply to incoming signal, stimulus or message without even reading or get knowledge of it, and reversibly, to predict who would be interested in a message, or would have a propensity to communicate with them, without even getting in touch, or knowing these potential interlocutors.

SUMMARY OF THE INVENTION

An aspect of the invention relates to a method in an electronic system for measuring relevance levels of an incoming or outgoing message for presenting it to an interlocutor, without having to actually interact with the interlocutor. The method comprises the steps of:

extracting from the message, a flow of digital signals pertaining to transmission/reception context features, to content of the message and/or to other interlocutors with the interlocutor;

weighting probabilistically the digital signals by means of indicators of relative and interrelated frequencies of occurrences of the same digital signals extracted from previous messages;

from the results of the above steps, auto-generating a Bayesian network that allows the interlocutor to obtain a probabilistic prediction on the attractiveness of sent/received signals or messages, or find most probably interested interlocutors for a given information or message, each node of the Bayesian network being associated with a signal.

This method allows to satisfy the need to qualify, by measuring interest in, evaluating the propensity to get knowledge of, or showing interest in incoming and/or outgoing stimuli received and sent on a electronic messaging or signaling system, including instant messaging, electronic mail, and not exclusive of any machine, which present the capacity to exchange electronic, digital or textual stimuli.

This method allows to provide individuals a score (expressed in a probability of interest) both on individuals who emitted a signal or message to their attention, and on the messages themselves that are being sent to them, before they had opened or got knowledge of these incoming stimuli.

This method solves many problems in the field of conditional probabilities applied to communication. Probability theory studies the possible outcomes of given events together with their relative likelihood and distributions. Thomas Bayes developed a theory in order to determine probabilities of events knowing the probabilities of other events, in his Essay towards solving a problem in the doctrine of chances published in the *Philosophical Transactions of the Royal Society of London* in 1764. Bayesian learning of probability distributions means to update a prior belief on the basis of the evidence. Evidence are linked to models in belief networks,— or "Bayesian network"—, where knowledge and inference are separated. These networks contribute to the calculation of conditional probability distributions.

Contrary to previous technical solutions this method does not require the intervention of the interlocutor using the system. The method does not require the interlocutor to pre-qualify individuals, texts, stimuli or messages. The method does not require individuals to discriminate specific words or stimuli, or individuals. The present method is a self-learning technique that auto-generate scorings of interest and propensity to read or reply to incoming and/or outgoing stimuli.

This method hence does not require the interlocutor to define, precise or enrich the analytical press with rules concerning stimuli, text, content or individuals who may send or receive stimuli. The analytical process generates its own learning, and auto-generates through its learning of interactions and exchanged contents or stimuli a Bayesian network, which is unique and specific to the interlocutor.

Advantageously, the relative frequencies and the shape of interrelations of the Bayesian belief network are updating in real-time and over time, as to increase the performance of predictions and accurateness of interactions.

The resulting probabilities of the potential interest of incoming and/or outgoing messages, and of senders, are given to the communicator in real time. Hence, with this characteristic, individuals can adjust their communication in real time (by changing the stimulus or sentences in their message) in order to optimize or maximize the likeliness of their messages to be welcome by their interlocutors. Similarly, this characteristic allows individuals to compose a message without giving to the machine the name of the potential receivers, or without knowing the names of the person who would be interested in their message. The list of interlocutors potentially interested in the composed message is automatically generated by the technology.

Further comprising a step of sharing personal Bayesian communication behavioral networks with other interlocutors, as to find individuals with the most likeliness and propensity to communicate on a given subject, or sets of stimuli, messages or topics, the method provides individuals with the hierarchical list of the most probable receivers for a given set of stimuli, without prior knowledge of the actual reaction of these individuals, and before submitting these stimuli or messages to them.

Further comprising a step of displaying the most probable other interlocutors for given signals, and or vice-versa the most probable signals for given other interlocutors, by means of a full reversibility between contents and individuals allowed by step of auto-generating the Bayesian network, the method provides automatisms to analyze the most probable combination of stimuli for a given receiver or group of receivers. This further step allows finding a list of potential authors or people interested in a given message on a very large network of people. This characteristic of the technology permit to find the potential authors of a lost message, or to describe the network of individuals who are the most likely to have authored or having shown interest in the chunk of knowledge being submitted to the technology. This characteristic of the technology can also be used to discover and trace the most probable senders and receivers or a lost or unidentified message over a network of interrelated persons.

Furthermore in the method, knowledge is separated from inferences, therefore allowing for an extension to multiple interactions, with multiple signals and multiple individuals to find the most probable receiver of a message or signal in a large population of other interlocutors, and vice-versa, the most probable contents or signals for a given population of other interlocutors.

Contrary to previous technical solutions to the above-mentioned problems, the method according to the invention does not rely on assumptions or pre-conceived models and/or rules of human communication. The output of the method is not statistical data on the communication behavior of individuals, used by a set of normative and discriminative rules. The method takes into account the relativity of communication. On contrary, this invention does not rely on preconceived hierarchy of causal relationships between the different categories of communication: the nature of the sender, the context of the sending, and the content being sent. Therefore, causal relationships and conditional probabilities between these relationships are built through automatic learning of the interactions taking place. For an individual, the context of communication may have a very strong influence (an overloaded interlocutor for example). For another individual, people may matter more than words, except for a few of them. For again another person, contents may matter the most, although not in some contexts, and not from some individuals on specific topics. This is what we call the "relativity of communication".

To date, efforts at addressing the foregoing problem of knowing who to communicate with on which topic with a likeliness of triggering interest, have not provided optimal solutions. Solutions that are based on manual configuration or customization of communication systems are too imprecise, too time-consuming, and may produce critical liabilities because of their Boolean discrimination processes. The presented invention substitute previous technical solutions with a method that do not destroy information, and therefore does not put the users at risk of missing an important communication or interlocutor that previous systems might have qualified as unwanted.

Advantageously, the method comprises at least one of the steps of:

permitting the interlocutor to interrogate the learning module on the most favorable features of his or her communication in order to increase the likeliness of a strong propensity to communicate from others interlocutors, herein including scoring in real time a message being composed, and showing different scores according to the signals being intended to be sent, before these signals, texts or messages are sent;

permitting the interlocutor to compose a signal, message or content without giving the name of a particular interlocutor, and interrogating the learning module to obtain a hierarchical probabilistic list of other interlocutors who would be the most interested in this message;

permitting the interlocutor to fix the probability level of attractiveness under which he or she does not want to receive any incoming message or signal, for each other interlocutor or emitter, or globally, on a given signal or text, the leaning module, here above described, being continuing to learn automatically and auto-generating without further human intervention.

Not relying on a preconceived and inert and/or configurable model, the step of generating a Bayesian belief network, generates a unique proper and specific model of communication behavior for each interlocutor where the models of interrelation between specific signals, contents, context of communication and characteristics and individuals are built from any data, through continuous learning.

Preferably in the method:

in the step of extracting from the message, a flow of digital signals, the totality of the information is preserved;

in the steps of weighting probabilistically the digital signals, each signal is conditionally and probabilistic weighted, as the interrelations between its content of information, and the emerging auto-generated models from continuous learning, therewith delivering a probabilistic assessment of the propensity to communicate, in regard of relative frequencies of signals, knowing the previous probabilities of propensities to communicate, interact, reply on relative frequencies of signals.

in the step of displaying, is displayed a hierarchical output of most probable interlocutors, or most probable signals or text that would foster attractiveness for the outgoing or incoming result, provided by probabilistic computation of the learning module, therewith not implying any reconfiguration, judgment, human and manual assessment from interlocutors, operators or platform owners.

Advantageously in the method, in step of displaying, an assessment of the likeliness of feed-back and interest of other interlocutors, is displayed to the interlocutor before sending the message for allowing the interlocutor to adjust communication in real-time.

Some phenomenon can appear in the world of communication.

For example, a source formerly perceived as unreliable on a very long period of time can send a message, which combination of stimuli is triggering a very strong interest by the receiver. Previous technical solutions would be likely to discriminate globally the sender.

Another example is the "cry wolf" phenomenon. A sender might send on a regular basis messages that are of interest for the receiver, but the receiver would be wary of being overloaded with information he already have knowledge of. However, the receiver has a learning curve about this individual and will try to detect intuitively what makes the incoming message more incongruous than usual and might decide to pay attention to this specific incoming message.

The method according to the invention provides remedies to these phenomenon when:

in the step of weighting the digital signals, an indicator measures relative frequency of appearance of each signal on the overall population of incoming and outgoing signals, therewith allowing for a self-designing management of the knowledge base of the system;

the number of interrelated nodes and externalities in the belief network with the node associated to said each signal is measured, assessing therewith a mortality factor of said each signal.

The invention further proposes a system for measuring relevance levels of an incoming or outgoing message for presenting it to an interlocutor, without having to actually interact with the interlocutor, the system comprising:

means for extracting from the message, a flow of digital signals pertaining to transmission/reception context features, to content of the message and/or to other interlocutors with the interlocutor;

means for weighting probabilistically the digital signals by means of indicators of relative and interrelated frequencies of occurrences of the same digital signals extracted from previous messages and for auto-generating from the probabilistic weights, a Bayesian network that gives a probabilistic prediction on the attractiveness of sent/received signals or messages, or most probably interested other interlocutors for a given information or message, each node of the Bayesian network being associated with a signal;

means for displaying of the probabilistic prediction on the attractiveness or a list of the most probably interested other interlocutors.

For increasing the performance of predictions and accurateness of interactions, the system comprises means for updating in real-time and over time, the relative frequencies and the shape of interrelations of the Bayesian belief network are, as to increase.

The system may comprise executable program instructions for sharing personal Bayesian communication behavioral networks with other interlocutor, as to find individuals with the most likeliness and propensity to communicate on a given subject, or sets of stimuli, messages or topics.

Advantageously in the system, means for displaying are arranged to display the most probable other interlocutors for given signals, and or vice-versa the most probable signals for given other interlocutors, by mean of a full reversibility between contents and individuals provided by the means for auto-generating the Bayesian network.

With an accurate advantage, the system comprises means for separating knowledge from inferences, therefore allowing the learning module for an extension of the Bayesian network to multiple interactions, with multiple signals and multiple individuals to find the most probable receiver of a message or signal in a large population of other interlocutors, and vice-versa, the most probable contents or signals for a given population of other interlocutors.

The invention further proposes a computer program product for measuring relevance levels of an incoming or outgoing message for presenting it to an interlocutor, without having to actually interact with the interlocutor, the program comprising:

instructions for extracting from the message, a flow of digital signals pertaining to transmission/reception context features, to content of the message and/or to other interlocutors with the interlocutor;

instructions for weighting probabilistically the digital signals by means of indicators of relative and interrelated frequencies of occurrences of the same digital signs extracted from previous messages and for auto-generating from the probabilistic weights, a Bayesian network that gives a probabilistic prediction on the attractiveness of sent/received signs or messages, or most probably interested other interlocutors for a given information or message, each node of the Bayesian network being associated with a sign;

and instructions for displaying of the probabilistic prediction on the attractiveness or a list of the most probably interested other interlocutors.

To increase the performance of predictions and accurateness of interactions, the program comprises instructions for updating in real-time and over time, the relative frequencies and the shape of interrelations of the Bayesian belief network are.

Advantageously, the program comprises instructions for sharing personal Bayesian communication behavioral networks with other interlocutors, as to find individuals with the most likeliness and propensity to communicate on a given subject, or sets of stimuli, messages or topics.

The instructions for displaying are preferably designed to display the most probable other interlocutors for given signals, and or vice-versa the most probable signals for given other interlocutors, by mean of a full reversibility between contents and individuals provided by the subroutines for auto-generating the Bayesian network.

With an accurate advantage, the program comprises subroutines for separating knowledge from inferences, therefore allowing the subroutines for auto-generating the Bayesian network to an extension of the Bayesian network to multiple interactions, with multiple signals and multiple individuals to find the most probable receiver of a message or signal in a large population of other interlocutors, and vice-versa, the most probable contents or signals for a given population of other interlocutors.

DESCRIPTION OF PREFERRED EMBODIMENTS

Figure 1:
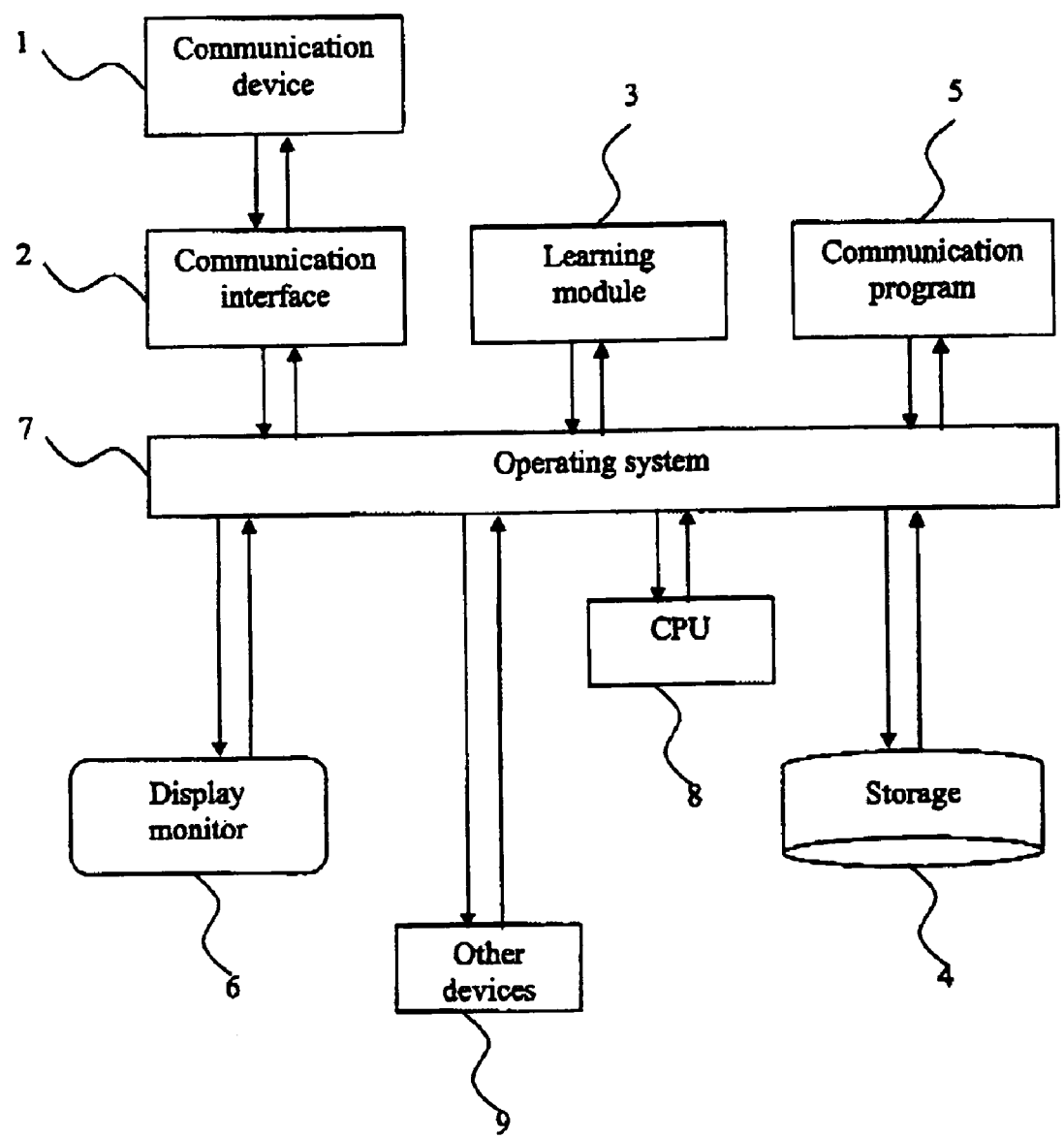
FIG. 1 is an overall view of a system according to the invention.

The system presented in FIG. 1 comprises a central processing unit (CPU) 8, a display monitor 6, a fixed or removable storage 4, a communication interface 2 and other devices 9 like keyboard, pointing device, printer or the like.

It is to be understood that the display monitor is not limited to a simple screen for displaying texts and pictures but can comprise also speakers to play sounds like voice or music.

The communication interface 2 is a conventional card or circuit for transmitting and receiving signals or messages to and from distant communication devices 1 like computers, phones, personal assistants or the like. The communication interface 2 is provided with conventional protocols on wide area network threw local area network, phone line, radio access network or any wireless network, to deliver digital data flows from the received signals into the system and to transmit signals from digital data flows produced by the system to the distant communication devices 1.

The system comprises further an operating system 7 for managing interactions between the CPU 8, the communication interface 2, the storage 4, the display monitor 6 and the other devices 9.

The system comprises also a communication program 5 like a known email or browser software for processing of the interactions managed by the operating system 7, making in that way the system to be a usable combination of means instead of a pure juxtaposition of means 2, 6, 8, 9 without program. When activating the communication program 5 by the other devices 9, a user of the system can display on the display monitor 6, texts, pictures or sounds produced by the communication program 5 from data flows delivered by the communication interface 2 and can send to distant communication devices 1, texts, pictures or sounds converted by the communication program 5 into data flows wherefrom signals are transmitted by the communication interface 2.

According to the invention, the system comprises a Bayesian learning module 3. Including a program, the learning module 3, inserted into the communication system, comprises:

an application with subroutines for generating Bayesian networks from incoming and outgoing data, captured from the communication interface 2 or gathered from the communication program 5, e.g. an electronic mail program;

data bases stored in the fixed or removable storage 4, which can already belong the communication system, such as in a computer, or which can be independent from this communication (such as a removable memory card);

a component, which establishes the dialog and exchange of elements of data between the communication program 5 and the Bayesian learning module.

Other communication devices 1, such as other computers, personal assistants or phones are able to send elements of data (such as text messages) to the communication system, and may comprise also or not, elements 2 to 9. Likewise, the communication system to which the invention pertains, is able to send elements of data and/or messages to external or other communication systems 1.

The Bayesian learning module 3 is capturing flows of data as they come in and out of the communication system, by gathering them into the communication interface 2 or by importing them in real time, or asynchronously, from the communication program 5. The interlocutor does not need to transmit these data to Bayesian learning module. The module is directly learning from the incoming and outgoing data without the assistance of the user. Hence, the module can for example import a complete mailbox from an email program and learn from the imported data.

The module is generating characteristics and models about the communication of the individual and its interlocutors and stores them for further treatment in storage 4. When the user wants to communicate, he or she is using his/her current communication program 5 and the module automatically start to observe his/her communication behavior, including the contents or messages being sent or received. The Bayesian module is then generating a score about several elements of the communication being established, and displays these scores of the user's screen 6.

This display of the scoring can be integrated to the communication program, which hence will need to be amended; or they can be displayed separately, appearing in a small window above the communication program, under a form know as "pop up" by the industry on the screen 6. In the latter case, the module can be integrated under the form of a "plug in" to the communication program. An interface in this window is communicating to the user the probabilities of attractiveness, banality, and incongruity, overloading effect of the messages he or she has received before the user has opened or read these messages. Reversibly, the Bayesian learning module communicates to the user the probabilities of the potential attractiveness, overloading effect, propensity to reply of the messages he or she is composing, and he or she is intending to send to interlocutors, before these messages are actually being sent, on the same display 6.

Figure 2:
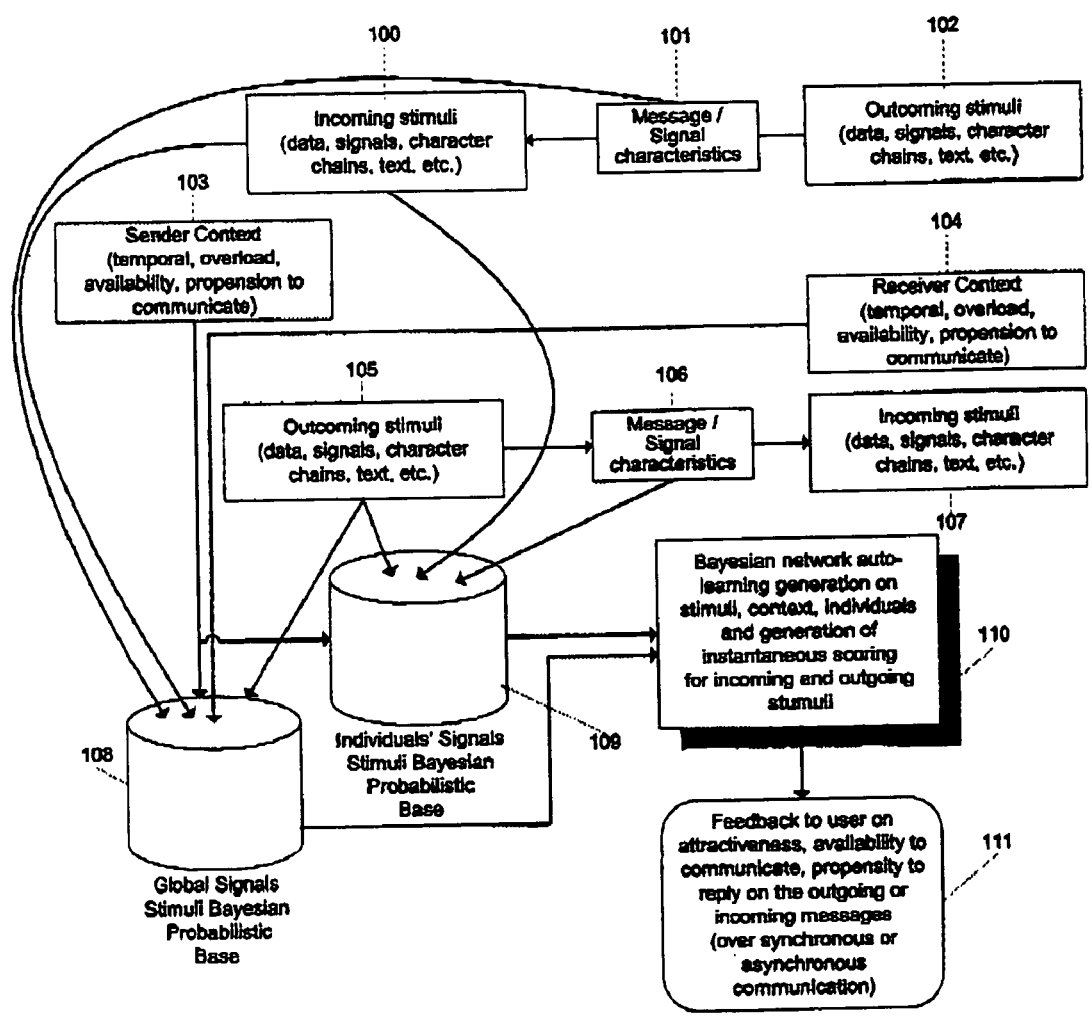
FIG. 2 is a schematic diagram of process executed by the system of FIG. 1.

FIG. 2 illustrates the functioning of the system described with reference to FIG. 1. The presented method is applicable to any existing communication devices, including electronic mail (e-mail), mobile date communications (small messages systems), instant messaging over Internet Protocols, or any kind of communication technique that allows the extraction and transformation of signals in a digital form, text, or chains of characters and words.

The presented invention is not based on semantics or interpretation of the meaning of the contents, signals, or stimuli exchanged between individuals or machines. The presented system has no knowledge of the sense given to the messages. This invention has been deliberately designed in such way, so that privacy of individuals is protected.

Hence, the message/signal 101 can be formulated in any human or machine language. The data gathered by the method as considered as "signals" in the form of hexadecimal and numerical chains of data. These data can be words, but also digitalized sounds or images, as far as they can be organized in a series of chunks separated by blank signals.

These signals are attached to a sender 102 and recorded with their origin of emission. They are transferred to the receiver 100 and analyzed in real time on several characteristics: length, delay, density, congruity or incongruity with previous signals, relative timeliness and other variables of analysis. The signals increase a pile of data or database, with their relative frequencies and appearances, relatively to previous conditional probabilities of appearances. The storage of the signals is hence organized both under the form of Markovian chains and chronological data, on a global basis 108 and on an individual basis 109 stored in storage 4.

Relative mortality of signals has been taken into account in the presented method. As to imitate the cognitive processes of human beings, the lack of relative frequencies of appearances over time is assimilated in the method with the discrepancy of the signal. This original method allows to take into account very weak signals, that may not appear very often, but that present a strong relative interest with emerging new signals are not overlooked with the method. The relative mortality of individual signals 109 is generated in comparison with the relative mortality of the overall population of incoming and outgoing signals stored in the global signals and stimuli Bayesian probabilistic base 108.

The originality of the method also resides in the absence of preconceived rules on the communication of the individual or his/her interlocutors. Receiver context 104 and sender context 103 are taken into account, but do not obey normative rules. The method only records the dynamic and relative evolution of the characteristics of the communication, probabilistically conditioned by the exchanged signals 105, 106. Therefore, the method auto-generates a Bayesian network where nodes represents all the characteristics of signals 105, 106, senders and receivers 100, 102, 105, 107 and their contexts 103, 104 without prior hierarchy or causal attributions.

Hence, the method allows laming and generating a model of communication from the signals exchanged by interlocutors. The more time the system can learn from interlocutors' interactions, the more precise and reliable are becoming its predictions. A series of tests were conducted that show that the learning on an historical basis of 300 set of stimuli (or "messages") is sufficient to generate a performing learning with this invention.

The method allows the system to learn automatically without the intervention of a human being. The Bayesian networks, or belief networks, are generated automatically, and produce instantaneous scoring for incoming and outgoing stimuli 110. The initial learning can be established on an imported base of previous signals exchanged between several interlocutors. For example, the method allows for the importation of any existing mailbox messages, and generates a first Bayesian network that will later evolve as the users start to use the process of this invention.

The output is the real-time, synchronous or asynchronous delivery of several scoring to the interlocutor. These scores include the attractiveness of incoming messages or signals, measured with a percentage for each incoming message; the probable propensity to reply of an interlocutor on a given specific message (expressed in percentage as well); the capacity to change the signal or message and see the scoring change accordingly in real time; the determination of the best (more interested, or more likely to reply) receivers, under the form of a dynamic hierarchical list, for a message which is composed without the specification of any particular interlocutor 111.

Figure 3:
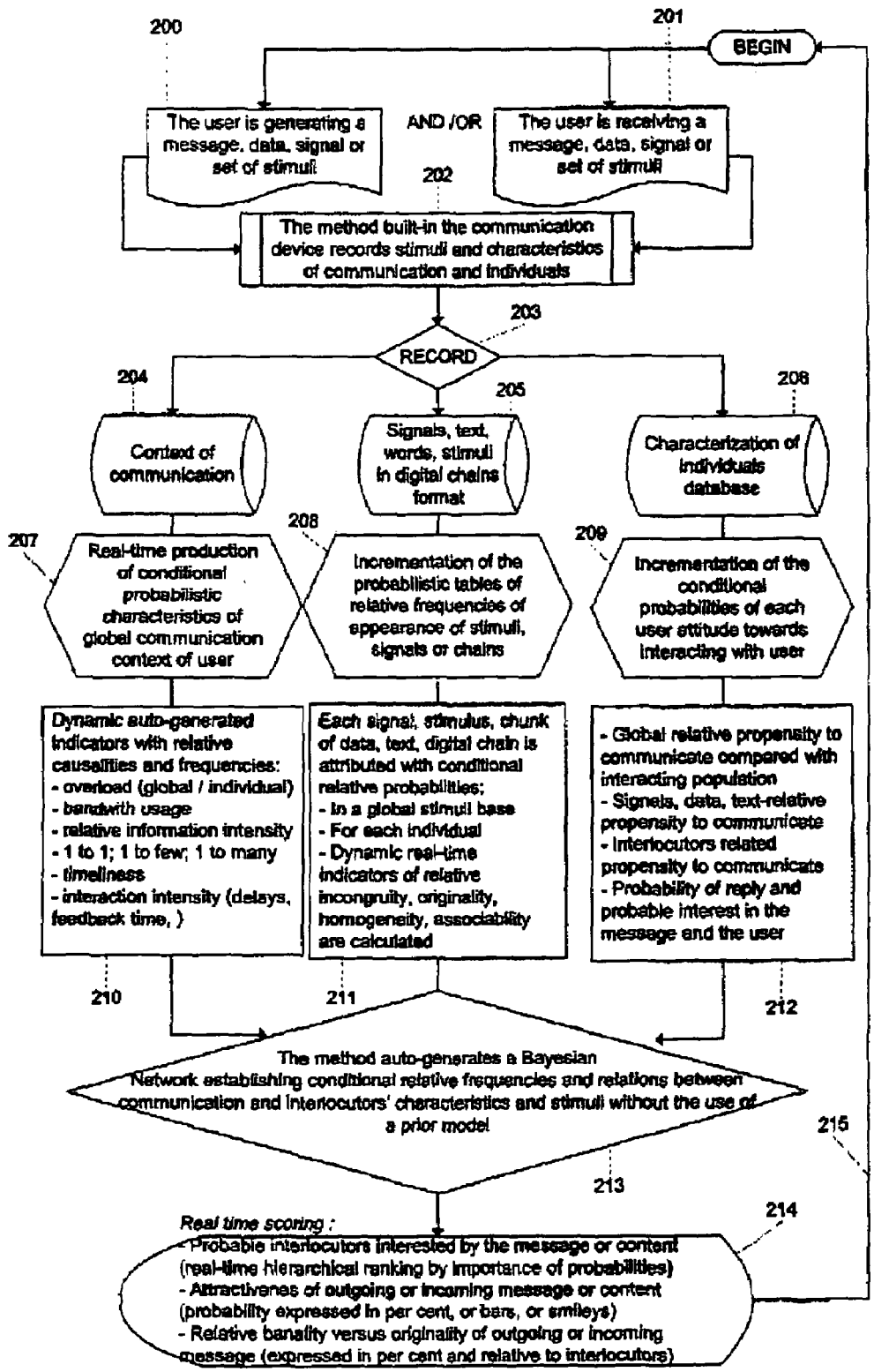
FIG. 3 is a flow diagram of a method according to the invention.

FIG. 3 illustrates the method executable by mean of the learning module, with all the necessary steps of gathering, treatment of data necessary to the operational effectiveness of the invention. For each transaction, the user of the system is an interlocutor, users of distant communication devices 1 are other interlocutors.

The system generates in a step 200 under request of the interlocutor or receives in step 201 under request of others interlocutor messages, signals, data or set of stimuli.

In a step 202, the system gathers data by extracting from the message, a flow of digital signals pertaining to transmission/reception context features, to content of the message and/or to other interlocutors with the interlocutor. The content of the message is cut into individual elements W of data.

In a step 203, the communication program 5 of the system records the message for the application that has been chosen by interlocutors to communicate (electronic mail, instant messaging, etc.). The recording of the communications is only used for further treatment, and the message does not need to be kept in storage when the treatment of the module learning has been automatically applied. This technical characteristic has been designed deliberately so as to protect the further interlocutors' privacy.

The gathered data are separated in three different recording storage spaces:

in a step 204, signals pertaining to the context of communication of interlocutors are stored by the system in a first specific storage space, in a step 205, signals pertaining to the content of the message, in the form of chunks of said content, are stored by the system in a second specific storage space without need to keep in storage the integrality of the message, for privacy purposes, in a step 206, signals pertaining to the relative characteristics of individuals, longitudinally and at the time of communication are stored by the system in a third specific storage space.

In a step 207, the system generates conditional probabilistic characteristics of the global communication context of the interlocutor. The learning module 3 observes the overall communication behavior of the interlocutor and auto-generate conditional relationships between all its characteristics; such as overload (the relative level of attention available for incoming messages in comparison with the overall level of attention needed at the level of activity); bandwidth usage (the relative intensity of communicating, related to the signals received); if the communication is one to one, or one to many, the timeliness of the signals (evaluated on the basis of relative signals mortality compared to a square function of the mortality of incoming messages); and the relative interaction intensity (the delays, speed, temporality of the current interaction in relative frequencies of previous interactions). These intermediate conditional probabilities are not disclosed to the interlocutor. They present themselves under the form of Markovian chains and real-time dynamic indicators that are used by the module. They do not require any human intervention.

In a step 208, the learning module increments probabilistic tables of relative frequencies of appearance of stimuli, signals or chains of characters. The learning module 3 comprises a semantic cleaning process as to eradicate doubloons, and correct misspellings, so that unnecessary noise is not introduced in the learning process. However, this module does not comprise any further semantic function. Signals or data elements W are interrelated when they frequently and conditionally appear with each other.

For each element W of data, indicators $X_i$ are recalculated when already existing in association with a previous occurrence of the element W or built in association with a first occurrence of the element W. Here are some examples of indicators $X_i$, i from 1 to m where m can be more than twelve, with methods of calculation:

The relative frequency $X_1$ of the element W in the overall interactions $N_T$ of the user with all his or her interlocutors. $N_W$ being the number of interactions comprising W, $x_1 = N_w/N_T$.

The relative frequency $X_2$ of the element W in the $N_{II}$ 1 to 1 interactions of the user with this specific interlocutor I. $N_{W1}$ being the number of interactions comprising W, $x_1 = N_{w1}/N_{IT}$.

The relative personalization $X_3$ of the incoming or outgoing message, factorized on the basis of the relative frequency $N_{IT}/N_T$ of 1 to 1 communications with the specific receiver or emitter, knowing the overall relative frequency $N_{II}/N_T$ of 1 to 1 communications of the user.

The relative mortality $X_4$ of the elements of data comprised in the communication. This mortality index $X_4$ is used to save storage place and in further calculations to take into account elements of data W with the lowest mortality for a given interlocutor or a given content or message being sent or received. This mortality index is factorized on the basis of the relative frequencies of appearance of this element in the past interactions between interlocutors.

The interlocutors mutual intensity $X_5$ of interaction, which is factorized on the combination of relative personalized communication, specific frequency as opposed to average frequency of interaction, the relative frequency and speed of feed-back to this specific interlocutor, the relative frequency of contents or words emitted by this interlocutor, which trigger the fastest relative frequency of feed-back.

As the above, the personal intensity $X_6$ of communication towards the emitter is factorized without taking into account the mutuality of the phenomenon.

As the above, the specific intensity $X_7$ of communication is factorized. The two precedents ratios are used to calculate the asymmetry in the interpersonal intensities of communication.

A community index $X_8$, which is factorized on the basis of the relative frequency of contents or elements of data in the N % more active and intense interlocutors. The value N is automatically generated as a factorization of the population of users (variables) who explain the most the variations of behaviors in the user's communication. As a consequence, this community index is an entirely dynamic factor that varies according to both the receivers and senders' communication behavior in the observed and learnt interactions.

The receiver's relative overload factor $X_9$, which is calculated on the basis on the relative usage of its bandwidth by a given interlocutor put into relation with the average usage of bandwidth relatively to the time of the day, and the overall intensity of communication.

General Incongruity $X_{10}$: relative frequency of data, words having not previous occurrence in previous message The familiarity $X_{11}$ of contents or elements of data, which is factorized on the basis of the relative frequency of contents in global previous contents conditional database.

The specific familiarity $X_{12}$ of contents from the specific sender is factorized by the percentage of relative frequent data in the message in comparison with the overall familiarity of contents.

Therewith, for each element W of data, respectively for each interlocutor I, the database 108, respectively 109, is incremented with the results of above factorizations for a the message, new received or new ready to be transmitted. The message is represented by a series of factorized characteristics and variables. Inferences of the relationship between the variables, and accordingly, probabilistic dependencies between variables are generated in a following step 211 by a Bayesian Network already generated for previous messages.

A belief network also called Bayesian network or probabilistic network, consists of a directed acyclic graph of nodes and arcs, referred to as a network structure, and a set of conditional probabilities associated with the graph. Nodes represent the random variables, and arcs represent probabilistic dependencies amongst the variables. The terms 'node' and 'variable' are used interchangeably. Associated with each node is a conditional probability of the variable given the conditional probability of its parent nodes. Inference refers to the process of computing the posterior probability of one particular variable given some other variables (also called evidences). Bayesian networks may be created from prior knowledge or built automatically from data. When learning a Bayesian network from data, one generally considers two subtasks: learning the structure (i.e. the graph edges) and the parameters (i.e. the local conditional probability). The complete process of building and using the Bayesian network is the object of step 213 later described. For the first message, the repartition of probabilities is uniform, so as to get a maximum of information potential I=1, i.e. a maximum of uncertainty according to the theory of information.

In the step 211, the module generates automatically a web of signals that are related in the exchanged communications between individuals, under the form of conditional Bayesian networks. For example, the Bayesian network automatically generates the probability of seeing the word "stock", knowing the probability of the relative frequency of the word "market". Words or signals which appear to be orphans, relatively over time, increase their mortality, relatively to other criteria such as the propensity to generate a feed-back on these signals, however their orphan state. The use of mortality is a central innovation in this process. Signals mortality is defined in this method as the diminishing socialization of signals (the number of linked other signals and their age); the diminishing feedback triggering of these signals; and their increasing relative banality with previous global state of the whole signals base (a signal that is very banal in the base as it was N months ago, has more likeliness to mortality). The mortality of signals is not measured by a set of fixed rules however. If socialization appears to have less and less influence on mortality, on the contrary of feedback triggering, for example, then the Bayesian belief network will simply self-design itself and reorganize the relationship between nodes and their conditional probabilities. These relative indicators can be calculated in real time or asynchronously.

The step 209 presents similar functionalities of the step 208, applied to a population of individuals instead of a population of signals. The method is here also to participate to auto-generation of the Bayesian network that learns from the interaction between interlocutors (who can be human or machines). Here class indicators $C_k$ are created or incremented when already existing. A class indicator $C_k$ is a result of an action, which has been taken either by the emitter or the receiver of incoming or outgoing messages. For example, $C_1$ can take the value $c_1=1$ if the receiver has replied to message, or $c_1=0$ if he or she did not reply. The output is a probability that the class indicator takes one of the Boolean values, which can take 2 or more states. These indicators $C_{k-1 \ to \ N}$ include replying, relative speed of replying referring to the factorization of average time of reply to specific interlocutor, network centrality of emitter or receiver, scoring of interest of incoming and outgoing messages or stimuli. All the class indicators are factorized to further obtain the final result of mutual or asymmetrical propensity of communication between the interlocutors.

In a step 213, the relative weight of the above characteristics of communication (context, signals, individuals) is left to the auto-generated emergence of the final Bayesian network. That is to say that neither the inventor of the method, nor the interlocutor has prior knowledge of the overall configuration and interrelations of the generated belief/Bayesian network. To each interlocutor is associated a unique global Bayesian network according to his or her own context of communication, preferred or disliked signals and their combination, and interlocutors. For example, an interlocutor who spend most of his/her time with a single other interlocutor may likely have this other interlocutor as the starting node of his personal Bayesian network, given that the probability of interacting with this person conditions most of his/her communication behavior. Another example would be an individual who is obsessed with a specific topic. In this case, the population of signals that have emerged as constituting the most conditional nodes for the Bayesian network is likely to be at the starting node of his/her network. This characteristic of the step 213 constitutes a very innovative method that has not been implemented before in similar technical solutions.

The probabilistic relationship between all the variables is learnt by the Bayesian Network on the basis of prior evidences and prior architecture of these relationships, or "arcs" between the "nodes". A new form of the Bayesian Network is generated after the elements of data, and the factorized variables have been propagated. The automatic generation of the Bayesian network is performed as follows.

(a) A Bayesian network is created with one node for each of the less or more indicators $X_1$ to $X_{12}$ defined above.

(b) For each couple of indicators (Xi, Xj), the mutual information is computed conditional to one of the class indicators $C_k$ (which defines how the user treated the message).

$$I(X_i, X_j | C_k) = \sum_{x_i, x_j, c_k} P(xi, xj, c_k) \cdot \log \frac{P(x_i, x_j | c_k)}{P(x_i | c_k) \cdot P(x_j | c_k)}$$

Then the algorithm looks for the "maximum weight-spanning tree", i.e. the network in form of the tree, which maximizes the sum of mutual information along its edges.

The communication is score by the Bayesian Network, and a global score of "attractiveness" of incoming or outgoing message is calculated, accordingly to new relationships ("arcs") that have emerged between nodes, and the new evidences gathered from automated observation and gathering of elements of data of communication. When a new message is received, or prepared for emission, all indicators relative to this message are calculated. Inference is performed in the Bayesian network to calculate the probability distribution for each of the output node(s) (attractiveness). The probabilities of attractiveness, mutual or asymmetric propensities to communicate, potential emitters or receivers, etc., knowing prior probabilities, are then available; before the message has been sent, or read if received.

In a step 214, the Bayesian network is used by the learning module 3 to generate series of indicators that are disclosed in real-time to the interlocutor, under the form of a percentage (next to the message and the interlocutor), or a smiley, a color code, a sound or a metric bar. These scores can also be calculated on an asynchronous basis, for example, once a day. They inform the interlocutor of the probable interlocutors interested by a message or content that is being composed; the attractiveness of both outgoing and incoming messages or signals or contents; and a selection of other characteristics amongst the characteristics that can be analyzed by a Bayesian network (conditional probabilities). The final scores are displayed to the end-user in real time or asynchronously, either in the form of a specific window, or "pop up", or in the form of these scores being displayed or represented (by smileys or bars) next to the name of sender or receiver and its message.

For example, an interlocutor can interrogate which time of the day would be the best to send a message to an interlocutor, given that the learning module 3 has already learnt in step 213, the relative "overload" of interlocutors, in relation with the topics (content, signals) and other context dimensions. Instead of a percentage, in this case, the method delivers an hour and minutes during the day. For example, "Your message on this matter would benefit from being sent between 2 and 3 PM". The learning module 3 for execution of steps 202 to 214 have been fully developed under an industrial prototype as to experiment potential applications and portability.

The prototype is composed of a personal computer, several standard interpersonal communication devices (mobile phones, personal digital assistants with communication capabilities, electronic mail software with Internet Protocols). The objective of this prototyping was to test both the portability and the interoperability of the method to several equipment of interpersonal interaction, with synchronous and asynchronous communication. Potential applications were assessed in five different domains: the management of knowledge in organizations; the resistance of individuals to unwanted communications or messages; the matching between people; information security; and file exchange between individuals.

For matching a chunk of knowledge with a potentially interested individual (knowledge management), the invention successfully allows an individual to find the most potentially interested correspondents for a message in the population of people he/she has interacted with. The developed prototype is client-based module, and therefore its learning on the interacting population solely. As inferences and knowledge are independent in Bayesian Networks (evidences are propagated and generate or transform the modules, but they are still independent objects), the invention in its present and above described state can be implemented in a communication environment at the server level.

For avoiding unwanted messages or people (anti-spawning technology), comparisons of the performance of the invention with existing technologies showed better performance because the filtering of unwanted messages is based on a global appreciation of all characteristics of messages (including signals that can be pictures, emitters and also content). The invention proved superior because the combination of conditional probabilities with very low scores on emitters, contents and contexts were more discriminative than current technologies. Moreover, successful tests were conducted on distribution lists, where the emitter is welcome (the interlocutor has subscribed to the mailing list) but only a very few messages are interesting for him or her. The use of the method described above allows the interlocutor to subscribe to more mailing lists or information newsletters and to diminish the amount of information received simultaneously. The rate of interest (probability of attractiveness of the incoming message) was fixed at 90% for this test.

For matching people according to their mutual propensity to communicate (matching services), the method presented above is delivering a score on interlocutors. Each interlocutor has a global score, composed of an index of all other items, next to its identification or name. This score signifies the global propensity to communicate of the interlocutor. These scores are quite often asymmetric. There are people we have a strong propensity to communicate with, but the reverse is not likewise. Tests show that intimate circles of friends display a strong mutuality in propensity scoring, with small variations.

The invention can hence be used by "matching services", i.e. companies, which specialize in helping people to find a partner, a romance, or a professional contact. The method can be implemented on instant messaging as well as on electronic mail systems. The advantage of the invention resides in its automation and technical independence, both from the interlocutor and the operator of the matching platforms.

Moreover, individual scoring is dynamic and changes during the conversation between two persons. This characteristic of the invention allows playful applications, where people can see their reciprocal level of attractiveness (propensity to communicate) diminishing or increase as they exchange instant messages. As the technology is also predictive, the invention can be used to find the "best match" in a population of interlocutors, based on the learning of the interactions of the overall population.

For tracking potential emitters or receivers of a given information (information security), the presented method allows to determinate the potential authors, or the potential correspondents for any given chunk of signals or information Thus, the method can be used to draw nets of propensity to communicate around a sensitive topic in very large networks and can be used for information security purposes.

For file or content exchange between individuals, as the method does not make any difference between type of signals; i.e. text or any kind of digital content, it can potentially be used to connect people with similar or convergent interests in files being exchanged. An easy implementation can be to use the title of songs, for example, for a musical files exchange system.

This invention addresses the need to qualify, measures interest in, evaluates the propensity to get knowledge of, or showing interest in incoming and/or outgoing stimuli received and sent on a electronic messaging or signaling system, including instant messaging, electronic mail, and not exclusive of any machine, which present the capacity to exchange electronic, digital or textual stimuli.

This invention provides individuals with the hierarchical list of the most probable receivers for a given set of stimuli, without prior knowledge of the actual reaction of these individuals, and before submitting these stimuli or messages to them.

This invention provides individuals a score (expressed in a probability of interest) both on individuals who emitted a signal or message to their attention, and on the messages themselves that are being sent to them, before they had opened or got knowledge of these incoming stimuli.

As principal applications can be mentioned: Predictions of communication behaviors, answers, reply and feed-back of individuals in real-time or asynchronously; Systems to match demand for content, information, signals, and individuals who might probably show interest for those; Systems to track, mine and discover the most probable emitters of a given signal, or reversibly, the most probable signals for an emitter or receiver, Avoiding unwanted messages or people in an electronically mediated interaction; matching people according to their mutual propensity to communicate with each other, or on a given topic or sigal. Tracking potential emitters or receivers of sensitive or critical information for security purposes in a given network of interrelated interlocutors with an history of interacting.

The invention claimed is:

1. In an electronic communication system, a method for measuring attractiveness of incoming and outgoing messages, the method comprising the steps of:
   extracting from each of the incoming and outgoing messages, a flow of digital signals pertaining to transmission or reception context features, to content of the message, and to other interlocutors in relation with a particular interlocutor;
   measuring, by machine capture and computation, relative and interrelated frequencies of occurrences of the same digital signals extracted from previous messages;
   measuring, by machine capture and computation, a frequency of feedback response, for each data content, interlocutor, and context feature;
   measuring, by machine capture and computation, a frequency of feedback response for presence of a combination of content and interlocutor and context feature;
   calculating, from the frequencies of feedback response, interrelated and relative probability of triggering an interaction between two interlocutors based on identification of presence of the combination of content, interlocutor, and context feature; and
   from results of the extracting and measuring steps, auto-generating a Bayesian network without an initial model, the Bayesian network to be used to obtain a probabilistic prediction on an attractiveness of the incoming and outgoing messages, and to find most probably interested interlocutors for each outgoing message, each node of the Bayesian network being associated with a respective digital signal that represents one of a data content, interlocutor, and context feature.

2. A method according to claim 1 wherein new machine-captured incoming and outgoing signals that have not been previously captured by the machine, are added to the Bayesian network as representing new data, for which the relative frequencies and a shape of interrelations of the Bayesian network are updated in real-time, so as to generate newly discovered relative probabilistic frequencies of interrelation between the particular interlocutor and content and context feature, and the new incoming and outgoing signals so as to generate automated and autonomous machine learning, without prior model and without human handcrafted input and teaching.

3. A method according to claim 1 further comprising the step of extracting from an output of the machine learning the range from the highest to the lowest probabilistic levels of triggering an interaction for all learned combinations of data contents and context features with interlocutors, so as to find interlocutors having a highest likelihood and propensity to communicate on a given combination of subjects and context features.

4. A method according to claim 1, further comprising the step of displaying most probable other interlocutors for given signals, and most probable signals for given other interlocutors, by using a full reversibility between contents and interlocutors allowed by the step of auto-generating the Bayesian network.

5. A method according to claim 1, further comprising extending the step of auto-generating the Bayesian network to multiple interactions, with multiple signals and multiple interlocutors, by separating knowledge from inferences made in said step of auto-generating the Bayesian network, to find a most probable receiver of a message in a large population of other interlocutors.

6. A method according to claim 1, further comprising at least one of the steps of:
   permitting the particular interlocutor to interrogate a learning module on most favorable features of his or her communication in order to increase the likelihood of a strong propensity to communicate from other interlocutors, including scoring in real time a message being composed, and showing different scores according to the message to be sent, before the message is sent;
   permitting the particular interlocutor to compose a message without giving the name of a particular interlocutor, and interrogating a learning module to obtain a hierarchical probabilistic list of other interlocutors who would be most interested in the message;
   permitting the particular interlocutor to fix a probability level of attractiveness under which the particular interlocutor does not want to interact, for each other interlocutor, whereby a learning module continuously learns automatically to carry on with the step of auto-generating without further human intervention.

7. A method according to claim 1, wherein the step of auto-generating a Bayesian network comprises generating a unique proper and specific model of communication behavior for each interlocutor where the models of interrelation between specific signals, contents, context of communication and characteristics and interlocutors are built from any data, through continuous learning without relying on an initial model.

8. A method according to claim 7, wherein the step of extracting from each message a flow of digital signals comprises preserving the totality of the information, wherein the step of weighting probabilistically the digital signals comprises weighting each signal conditionally and probabilistic as the interrelations between its content of information, and the emerging auto-generated models from continuous learning, and delivering a probabilistic assessment of the propensity to communicate, in regard of relative frequencies of signals, knowing the previous probabilities of propensities to communicate, interact, reply on relative frequencies of signals, the method further comprising the step of displaying a hierarchical output of most probable interlocutors, or most probable signals or text that would foster attractiveness for an outgoing or incoming result, provided by probabilistic computation of a learning module, without reconfiguration, judgment, or human and manual assessment from interlocutors, operators or platform owners.

9. A method according to claim 1, further comprising the step of displaying an assessment of a likelihood of feed-back and interest of other interlocutors, to be viewed by the particular interlocutor before sending the message for allowing the particular interlocutor to adjust communication in real-time.

10. A method according to claim 1, wherein the step of weighting the digital signals comprises measuring, by an indicator, a relative frequency of appearance of each digital signal on an overall population of incoming and outgoing signals, to provide a self-designing management of a knowledge base, and wherein the step of auto-generating the Bayesian network comprises measuring a number of interrelated nodes and externalities in the Bayesian network with the node associated to said each digital signal, to assess a mortality factor of said digital signal.

11. A system for measuring relevance levels of incoming and outgoing messages associated with a particular interlocutor, the system comprising:
  means for extracting from each message a flow of digital signals pertaining to transmission or reception context features, to content of the message, and to other interlocutors in relation with the particular interlocutor;
  means for weighting probabilistically the digital signals using indicators of relative and interrelated frequencies of occurrences of the same digital signals extracted from previous messages and for auto-generating, from the probabilistic weights, a Bayesian network without an initial model, the Bayesian network providing a probabilistic prediction on an attractiveness of the incoming and outgoing messages, and most probably interested other interlocutors for each outgoing message, each node of the Bayesian network being associated with a respective digital signal;
  means for displaying the probabilistic prediction on the attractiveness of the incoming and outgoing messages, and the most probably interested other interlocutors for each outgoing message.

12. A system according to claim 11, further comprising means for updating in real-time the relative frequencies and the shape of interrelations of the Bayesian network so as to increase performance of predictions and accurateness of interactions.

13. A system according to claim 11, further comprising means for sharing personal Bayesian communication behavioral networks with other interlocutors, so as to allow other interlocutors to interrogate remotely with electronic communication means, the levels of likelihood of interest of this particular interlocutor, even when the particular interlocutor is absent and therefore not available for an interaction, to provide other interlocutors a highest likelihood and propensity to communicate on a given subject even in the absence of the particular interlocutor.

14. A system according to claim 11, wherein the display means are arranged to display the most probable other interlocutors for given signals, and the most probable signals for given other interlocutors, with a full reversibility between contents and individuals provided by the means for auto-generating the Bayesian network.

15. A system according to claim 11, further comprising means for separating knowledge from inferences, and a learning module for extending the Bayesian network to multiple interactions, with multiple signals and multiple individuals to find a most probable receiver of a message or signal in a population of other interlocutors.

16. A computer program product in a computer-readable storage medium in which instructions are embodied for measuring relevance levels of incoming and outgoing messages associated with a particular interlocutor, the instructions when executed causing a computer to:
  extract from each message a flow of digital signals pertaining to transmission or reception context features, to content of the message, and to other interlocutors in relation with the particular interlocutor;
  weight probabilistically the digital signals using indicators of relative and interrelated frequencies of occurrences of the same digital signals extracted from previous messages and for auto-generating, from the probabilistic weights, a Bayesian network without an initial model, the Bayesian network providing a probabilistic prediction on an attractiveness of the incoming and outgoing messages, and most probably interested other interlocutors for each outgoing message, each node of the Bayesian network being associated with a respective digital signal;
  and display, in a display device, the probabilistic prediction on the attractiveness and a list of the most probably interested other interlocutors.

17. A computer program product according to claim 16, wherein the instructions when executed cause the computer to further update in real-time the relative frequencies and a shape of interrelations of the Bayesian network so as to increase performance of predictions and accurateness of interactions.

18. A computer program product according to claim 16, wherein the instructions when executed cause the computer to further share personal Bayesian communication behavioral networks with other interlocutors, to find interlocutors with highest likelihood and propensity to communicate on a given subject.

19. A computer program product according to claim 16, wherein the instructions for displaying are designed to display the most probable other interlocutors for given signals, and the most probable signals for given other interlocutors, by means of a full reversibility between contents and individuals provided by the instructions for auto-generating the Bayesian network.

20. A computer program product according to claim 16, wherein the instructions when executed cause the computer to further separate knowledge from inferences, wherein the instructions for auto-generating the Bayesian network comprise instructions for extending the Bayesian network to multiple interactions, with multiple signals and multiple individuals to find a most probable receiver of a message or signal in a population of other interlocutors.

* * * * *